F. A. BROWN.
HAY PRESS.
APPLICATION FILED OCT. 30, 1918.
1,435,102.
Patented Nov. 7, 1922.
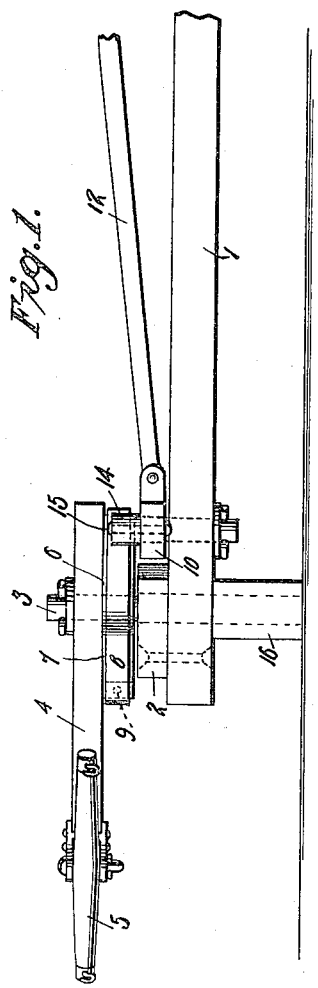
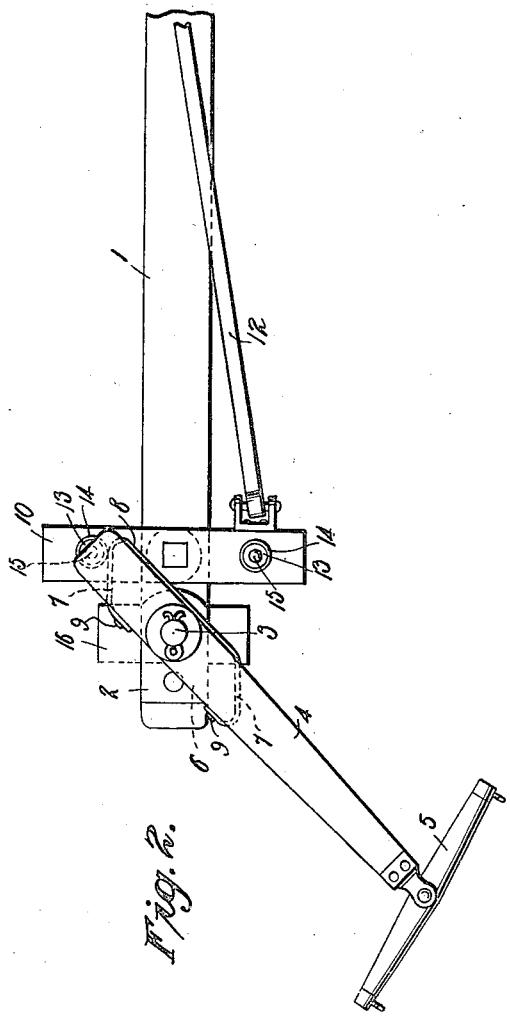
Witnesses
W. C. Fielding.
Inventor
F. A. Brown
By Victor J. Evans
Attorney Patented Nov. 7, 1922.

1,435,102

UNITED STATES PATENT OFFICE.

FARMER A. BROWN, OF COLLINSVILLE, ALABAMA.

HAY PRESS.

Application filed October 30, 1918. Serial No. 260,303.

*To all whom it may concern:*

Be it known that I, FARMER A. BROWN, a citizen of the United States, residing at Collinsville, in the county of Dekalb and State of Alabama, have invented new and useful Improvements in Hay Presses, of which the following is a specification.

This invention relates to improvements in hay baling presses and especially with reference to improvements in the horse power for operating the press, the object of the invention being to provide an improved horse power mechanism which is extremely simple and cheap and which can be almost entirely made of wood.

With the above and other objects in view, the invention consists in the construction, combination and arrangement of devices hereinafter described and claimed.

In the accompanying drawings:

Figure 1 is a side elevation of a baling press horse power mechanism constructed and arranged in accordance with my invention.

Figure 2 is a plan of the same.

My improved horse power mechanism for operating the plunger of a hay press or other like press is arranged on the outer end of the supporting beam 1 which extends from the bottom of the baling chamber of the press. A block 2 is secured on said support by means of a wooden pin 3, the said pin extending through openings in the block and support and the block being also made of wood. The sweep 4 is pivoted on the pin and is provided with a single tree 5 so that a horse can be attached thereto. On the under side of the sweep is a cam bar 6 which is also made of wood, is secured to the sweep and has a central opening through which the pin passes. The ends of the cam bar are oppositely rounded to form cams 7 and the cam bar is faced with a strip 8 of iron or steel which is bent therearound and securely fastened thereto, at the ends, as at 9.

The rocker bar 10 which operates the plunger of the press is made of wood and is pivotally mounted, at its center, on the support 1 by means of a wooden pin which turns in an opening in the support. The usual plunger rod 12 is connected to one end of the rocker bar and on the upper side of the rocker bar at points appropriately spaced from its ends are rollers 13 which are made of wood and which may be provided with iron tire bands 14. The rollers are mounted on pivots 15 and are arranged in such position as to be alternately engaged by the cams of the cam bar so that the required rocking motion is imparted to the rocker bar. My improved horse power mechanism is also provided with anchoring devices 16 at the outer end of the supporting beam 1.

It will be understood that inasmuch as various parts of my horse power mechanism are made of wood, the same can be readily constructed at very small cost.

Having thus described my invention, I claim:

The combination with a baling press, of an anchor block, a supporting beam secured thereto, a rectangular block securely fastened to the top side of said supporting beam, a bar disposed above said rectangular block and arranged for rotation thereon, said bar being beveled at each end to provide spaced parallel cam surfaces, a strip secured to each cam surface and following the bevel thereof, a sweep rigidly secured to the top side of said bar, a single tree mounted to one end of said sweep for the purpose specified, a pin passing through the sweep adjacent the end opposite the single tree, through the bar intermediate of its ends and through the rectangular block, beam and anchor block respectively, said pin providing a pivot for the sweep and bar and a retaining element for the rectangular block, beam and anchor block, a rocker arm pivotally mounted on said beam adjacent the rectangular block, spaced rollers pivotally secured adjacent each end of said rocker arm and projecting therefrom in the path of the movement of the cam surfaces, and means carried by the rocker bar for connection with the baling press.

In testimony whereof I affix my signature.

FARMER A. BROWN.